United States Patent
Sobran et al.

(10) Patent No.: US 11,055,081 B2
(45) Date of Patent: Jul. 6, 2021

(54) RECOMMENDING SOFTWARE PROJECT DEPENDENCY UPGRADES

(71) Applicant: International Business Machines Corporation, Armonk, NY (US)

(72) Inventors: Alexander Sobran, Chapel Hill, NC (US); Joseph Hughes, Durham, NC (US); John H. Walczyk, III, Raleigh, NC (US); Bo Zhang, Cary, NC (US); Darrough West, Winston-Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 16/132,609

(22) Filed: Sep. 17, 2018

(65) Prior Publication Data

US 2020/0089485 A1   Mar. 19, 2020

(51) Int. Cl.
*G06F 8/65* (2018.01)
*G06F 8/71* (2018.01)
(Continued)

(52) U.S. Cl.
CPC ............... *G06F 8/65* (2013.01); *G06F 8/71* (2013.01); *G06F 8/77* (2013.01); *G06K 9/6223* (2013.01)

(58) Field of Classification Search
CPC .... G06F 8/71; G06F 8/65; G06F 8/77; G06K 9/6223
See application file for complete search history.

(56) References Cited

U.S. PATENT DOCUMENTS 9,129,038 B2 * 9/2015 Begel ..................... G06F 8/74
9,389,986 B2 7/2016 Abraham et al.
(Continued)

OTHER PUBLICATIONS

H. Kagdi et al., "Mining software repositories for traceability links," 15th IEEE International Conference on Program Comprehension 2007, pp. 145-154, Retrieved on 2021-20-24. Retrieved from the Internet URL<https://ieeexplore.IEEE.org/stamp/stamp.jsp?tp=&arnumber=4268249> (Year: 2007).*

(Continued)

*Primary Examiner* — S. Sough
*Assistant Examiner* — Cheneca Smith
(74) *Attorney, Agent, or Firm* — Schmeiser, Olsen & Watts, LLP; William Hartwell

(57) ABSTRACT

A system and method for recommending whether to upgrade dependencies of a software project includes mining historical software data artifacts associated with a plurality of software projects to extract a plurality of metrics and dependency version lineages from the historical software data artifacts, clustering the software projects based on the metrics and the dependency version lineages, extracting target metrics and a target version lineage of a target software project selecting a software project cluster from the plurality of clusters that best matches the target software project, analyzing the metrics for each of the software projects included in the at least one software project cluster to determine that a measurable change to the metrics occurred as a result of upgrading dependencies of the software projects, and recommending which software dependencies of the target software project should be upgraded based on the measurable change to the metrics of the software projects.

20 Claims, 9 Drawing Sheets

(51) Int. Cl.
  *G06F 8/77* (2018.01)
  *G06K 9/62* (2006.01)

(56) References Cited

U.S. PATENT DOCUMENTS

| | | | |
|---|---|---|---|
| 10,657,023 B1* | 5/2020 | Willson | G06F 8/77 |
| 10,671,510 B1* | 6/2020 | Willson | G06F 11/3604 |
| 2012/0311534 A1* | 12/2012 | Fox | G06F 8/36 |
| | | | 717/120 |
| 2013/0067427 A1* | 3/2013 | Fox | G06F 8/70 |
| | | | 717/101 |
| 2014/0331206 A1 | 11/2014 | Abraham et al. | |
| 2018/0088929 A1 | 3/2018 | Eberlein et al. | |
| 2019/0205128 A1* | 7/2019 | van Schaik | G06F 8/77 |

OTHER PUBLICATIONS

Finlay, Jacqui, et al "Data stream mining for predicting software build outcomes using source code metrics." Information and Software Technology 56.2 (2014): 183-198. Retrieved on (Year: 2014).*
He Zhang, Investigating Dependencies in Software Requirements for Change Propagation Analysis, Journal of Information and Software Technology, vol. 56 Issue 1, 2014, ACM, 18 pages.
Marcelo Cataldo, Software Dependencies, Work Dependencies, and Their Impact on Failures, IEEE Transactions on Software Engineering, vol. 35, Issue 6, 2009, 38 pages.

* cited by examiner

Dependency A - Version 1

| Metric | Value |
|---|---|
| Defect Density | 1.1 |
| Build Time | 3.2 |
| Test Failure Density | 2.7 |
| Size of Deprecated Code | 4.5 |
| Size of Added Code | 6.4 |
| Deployment Time | 7.8 |
| Production Failure Density | 5.4 |
| Log Exception Density | 1.9 |
| Performance | 3.2 |
| Velocity | 2.3 |
| Security Vulnerability Count | 7.7 |

Dependency A - Version 1.1

| Metric | Value |
|---|---|
| Defect Density | 3.4 |
| Build Time | 1.7 |
| Test Failure Density | 5.9 |
| Size of Deprecated Code | 6.4 |
| Size of Added Code | 3.7 |
| Deployment Time | 5.1 |
| Production Failure Density | 0.9 |
| Log Exception Density | 1.7 |
| Performance | 4.3 |
| Velocity | 7.7 |
| Security Vulnerability Count | 6.1 |

Dependency A - Version 1.2

| Metric | Value |
|---|---|
| Defect Density | 3.4 |
| Build Time | 1.8 |
| Test Failure Density | 6.4 |
| Size of Deprecated Code | 5.9 |
| Size of Added Code | 3.4 |
| Deployment Time | 4.7 |
| Production Failure Density | 1.2 |
| Log Exception Density | 1.8 |
| Performance | 4.3 |
| Velocity | 7.7 |
| Security Vulnerability Count | 6.0 |

Dependency B - Version 1

| Metric | Value |
|---|---|
| Defect Density | 2.8 |
| Build Time | 1.9 |
| Test Failure Density | 5.7 |
| Size of Deprecated Code | 6.1 |
| Size of Added Code | 2.8 |
| Deployment Time | 5.1 |
| Production Failure Density | 1.1 |
| Log Exception Density | 1.7 |
| Performance | 4.8 |
| Velocity | 6.4 |
| Security Vulnerability Count | 5.9 |

Dependency B - Version 2

| Metric | Value |
|---|---|
| Defect Density | 2.9 |
| Build Time | 1.4 |
| Test Failure Density | 3.1 |
| Size of Deprecated Code | 2.3 |
| Size of Added Code | 2.1 |
| Deployment Time | 3.7 |
| Production Failure Density | 1.1 |
| Log Exception Density | 0.4 |
| Performance | 7.4 |
| Velocity | 5.1 |
| Security Vulnerability Count | 4.7 |

Dependency B - Version 3

| Metric | Value |
|---|---|
| Defect Density | 2.7 |
| Build Time | 1.6 |
| Test Failure Density | 5.7 |
| Size of Deprecated Code | 6.5 |
| Size of Added Code | 4.4 |
| Deployment Time | 5.1 |
| Production Failure Density | 0.5 |
| Log Exception Density | 1.3 |
| Performance | 3.9 |
| Velocity | 8.1 |
| Security Vulnerability Count | 6.1 |

RECOMMENDING SOFTWARE PROJECT DEPENDENCY UPGRADES

TECHNICAL FIELD

The present invention relates to systems and methods for software project dependency upgrade analysis, and more specifically the embodiments of a dependency upgrade recommendation system for recommending whether to upgrade dependencies of a software project.

BACKGROUND

Software developers and offering managers need to understand the value and risk associated with upgrading and adding a new dependency package, a package management tool, technology, or dependency. Further, software developers and offering managers must take into consideration many possible solutions when making an upgrade decision, which includes competing technologies, versions, or whether to make a change at all.

SUMMARY

An embodiment of the present invention relates to a method, and associated computer system and computer program product for recommending whether to upgrade dependencies of a software project. A processor of a computing system mines historical software data artifacts associated with a plurality of software projects to extract a plurality of metrics and dependency version lineages from the historical software data artifacts. The software projects are clustered based on the metrics and the dependency version lineages, resulting in a plurality of software project clusters. Target metrics and a target version lineage of a target software project are extracted. At least one software project cluster is selected from the plurality of software project clusters that best matches the target software project. The metrics are analyzed for each of the software projects included in the at least one software project cluster to determine that a measurable change to the metrics occurred as a result of upgrading dependencies of the software projects. Software dependencies of the target software project that should be upgraded based on the measurable change to the metrics of the software projects are recommended.

BRIEF DESCRIPTION OF THE DRAWINGS

FIG. 4 depicts multiple dependency-specific tables showing measurable changes to the metrics of a software project in a selected cluster, in accordance with embodiments of the present invention.

DETAILED DESCRIPTION

Figure 1:
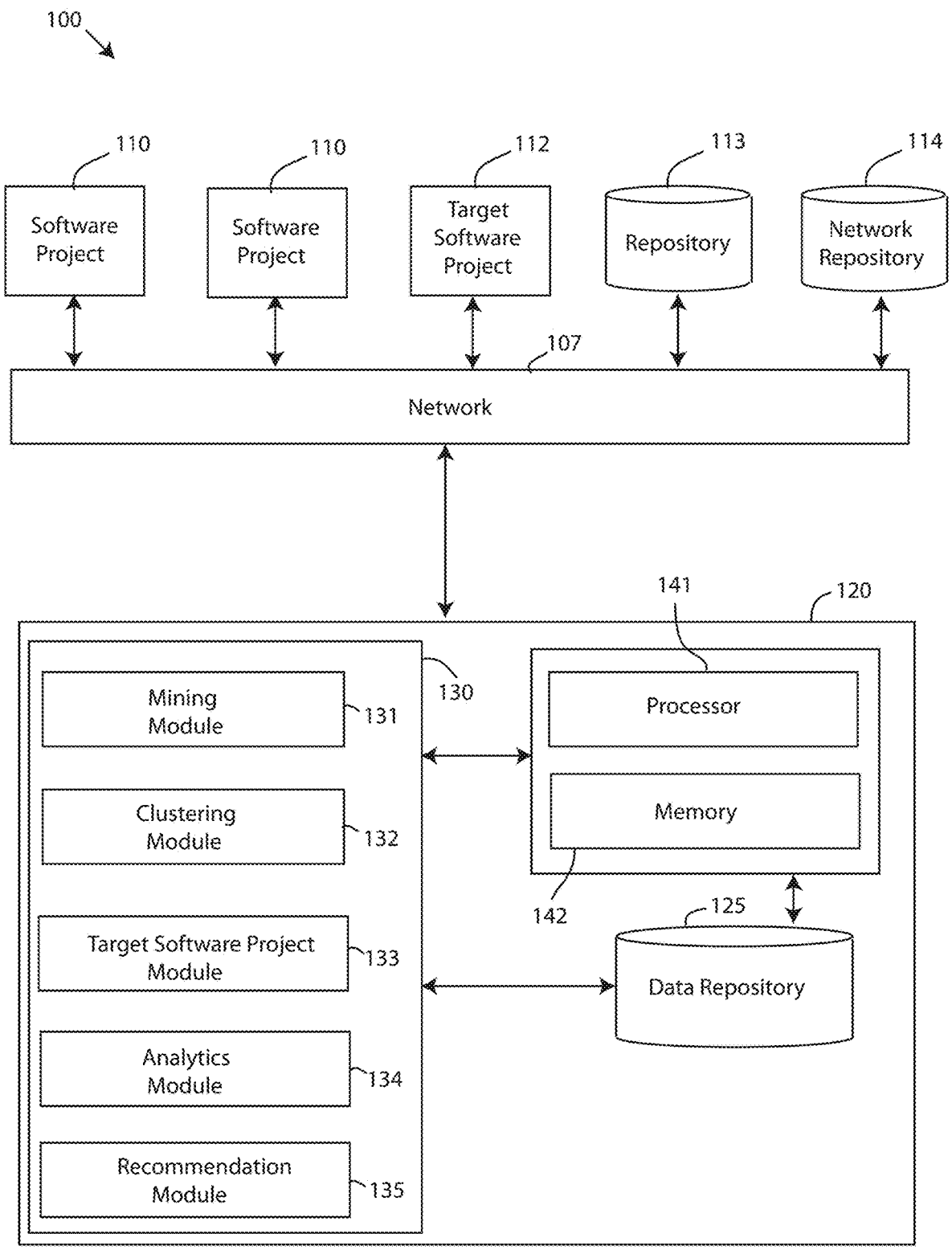
FIG. 1 depicts a block diagram of a dependency upgrade recommendation system, in accordance with embodiments of the present invention.

In brief overview, software developers and offering managers often need to decide whether to upgrade software dependencies associated with a software project. Factors in the decision to upgrade include whether additional or fewer defects in the code will occur, if the build time will change, if the deployment time will change, if the upgrade will change the test failure rates, if the upgrade will deprecate code in the software product, the required amount of code changes to implement, the change in the time to deploy the software product, whether the upgrade will change production failures or increase log failures, if performance will degrade, and the time to deliver or resolve issues after the change. Accordingly, software developers and offering managers need to manually factor in all the above data points to decide whether to upgrade software dependencies associated with the software project, and which specific change should be made.

In order to do so, software developers and offering managers will need to weigh each individual point against previous histories of implementation for each and every version and release for a given new package, technology, package management tool, or dependency across all previous implementations. To do this manually, software developers and offering managers review previous implementations, blog write-ups, documentation of the code, and information from code repositories, to assist the decision-making process. However, the manual review cannot be accomplished with any level of certainty. First, the specific upgrade is unlikely to have been performed in the past for a given software project. Second, a changeover, such as a specific version, is difficult for software developers or offering managers to remember and recall in detail. Third, the manual review would require a manual review of code repositories, looking at the dependency changes and then look at all the issues created afterward, which would be a very time consuming and error prone task for any large repository. Currently, tools are available for only a subset of the evaluation, and the current tools only use evaluation of the package as a stand-alone.

In contrast, embodiments of the present invention review a package using repositories to analyze the package as well as the implementation of the package in actual project code, which provides an understanding of not only the code within the package version, but also everything related to the changes required to add this package version. Embodiments of the present invention determine if a dependency version upgrade is worth pursuing on a given software project. Historical software data artifacts, like source control systems and continuous integration/continuous delivery (CI/CD) systems, are mined using tooling, such as tooling developed for IBM CLOUD DEVOPS INSIGHTS. A set of descriptive features/metrics for each mined software project is extracted, which is then used to cluster projects together. Each software project is then analyzed to determine the change of mined performance and quality metrics when dependency versions or dependencies in the projects are changed. Statistical tests are run on the target projects duster performance and quality metrics with respect to the dependency change to determine if the dependency version upgrade or dependency change had a measurable change in these metrics. A recommendation is then made to upgrade or not upgrade from the current version to the specified version or to change.

Referring now to the drawings, FIG. 1 depicts a block diagram of a dependency upgrade recommendation system 100, in accordance with embodiments of the present invention. Embodiments of the dependency upgrade recommendation system 100 is a system for recommending whether to upgrade dependencies of a target software project by analyzing metrics associated with dusters of software projects similar to the target software project. Embodiments of the dependency upgrade recommendation system 100 may be useful for software developers and offering managers deciding whether to upgrade software dependencies associated with a software project. For example, the dependency upgrade recommendation system 100 may look to similar software projects having similar dependencies that have previously performed an upgrade to the dependencies to determine if each dependency has successfully transitioned to the new version, and/or what amount of risk is associated with the upgrade version. Software dependencies or dependencies are software application files that are stored external to a software project that are needed to run the software project. Each software project can have multiple dependencies stored in a code repository or combination repository remote from the software project.

Embodiments of the dependency upgrade recommendation system 100 may be a recommendation system, a software project upgrade determination system, a recommendation engine, and the like. Embodiments of the dependency upgrade recommendation system 100 include a computing system 120. Embodiments of the computing system 120 may be a computer system, a computer, a server, one or more servers, a backend computing system, and the like.

Furthermore, embodiments of dependency upgrade recommendation system 100 include two or more software projects 110, a target software project 112, and a repository 113 that are communicatively coupled to the computing system 120 over a network 107. For instance, information/data may be transmitted to and/or received from the software projects 110, the target software project 112, and the repository 113 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing software artifacts, dependency version upgrades, recommendations provided, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging software artifacts, dependency version upgrades, recommendations provided, and the like, to generate both historical and predictive reports regarding a particular software project. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the software projects 110 are projects that produce new or enhanced computer code. Embodiments of the target software project include a software project that is being analyzed by the computing system 120 to provide a recommendation on whether an upgrade to the dependencies of the target software project s worth pursuing. Embodiments of the message augmentation system 100 also include at least one repository 113. The repository 113 is a database or other storage device that stores historical software artifacts received from various software projects. The repository 113 may be a code repository storing code of the software project, code of the dependencies of software projects and dependency version lineages of the dependencies of the software projects. For instance, the repository 113 stores one or more files that indicates a type of dependency is being used for a software project 110 and what specific version of dependency that the software project is using. The repository 113 stores data over a lineage (e.g. over a development time of the software project) so that all the changes that occurred in the repository 113 over time are also stored.

Furthermore, embodiments of the computing system 120 of the dependency upgrade recommendation system 100 are equipped with a memory device 142 which may store various data/information/code, and a processor 141 for implementing the tasks associated with the dependency upgrade recommendation system 100. In some embodiments, a recommendation application 130 is loaded in the memory device 142 of the computing system 120. The recommendation application 130 may be an interface, an application, a program, a module, or a combination of modules. In an exemplary embodiment, the recommendation application 130 is a software application running on one or more back end servers.

The recommendation application 130 of the computing system 120 includes a mining module 131, a clustering module 132, a target software project module 133, an analytics module 134, and a recommendation module 135. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the mining module 131 may include one or more components of hardware and/or software program code for mining historical software data artifacts associated with a plurality of software projects 110 to extract a plurality of metrics and dependency version lineages from the historical software data artifacts. For example, the mining module 131 mines public or private data associated with multiple software projects 110 from the repository 113. The historical software data artifacts are received over time from one or more centralized systems of the software projects 110 and stored in the repository 113. The centralized systems include a source control management system, CI/CD system, an issue tracking system, an automated build and test system, a monitoring system, and the like. In an exemplary embodiment, the historical software data artifacts are retrieved or otherwise received over time by the mining module 131 from the centralized systems of the software projects 110, such as GITHUB, JIRA, GITLAB, TRAVIS CI, JENKINS, NEW RELIC, SONARQUBE, and the like, and are mined using IBM CLOUD'S DEVOPS INSIGHTS tooling. Moreover, the mining module 131 joins the historical software data artifacts received from one or more centralized system of the plurality of software projects 110, and stores the historical software data artifacts associated with a plurality of software projects 110 in the repository 113, from which the historical software data artifacts are mined. For instance, the mining module 131 may join the software data artifacts associated with software project 110 based on a commit level of each data artifact, and then store the data artifacts in the repository 113.

As a result of mining the repository 113 storing the data artifacts, the dependency version lineages are extracted for each software project 110. The mining module 131 determines a dependency version lineage by mining the repository 113, which provides the details on which dependency is being used and also which version of the dependency is currently be used along with previous versions of the dependency. As an example, the mining module 131, for a given software project 110, can determine that two years ago the software project 110 was running version 1 of the software dependency, one year ago the software project 110 was running version 4 of the software dependency, and yesterday the software project 110 was running version 10 of the software dependency. Additionally, the mining module 131 extracts metrics associated with the software project 110 from the repository 113 as a function of the mining. The metrics are extracted by for each mined software project 110 by mining the dependency management artifacts and infrastructure as code artifacts in the source control artifact to determine commit levels where dependencies are changed from previous versions to subsequent versions. The data artifacts are then partitioned at the commit levels and each partition is labeled with the version of the dependency. The metrics are calculated for each of the versions and dependency partitions.

Examples of the metrics associated with the software projects 110 include a defect density (e.g. bug issues opened per bloc code per time), a build time (e.g. average time to build software in the CI/CD systems), a test failure density (e.g. average test failure per total test in CI and CD systems), a size of deprecated code (e.g. amount of code removed at dependency version change), a size of added code (e.g. amount of code added at dependency version change), a deployment time (e.g. average deployment time into environment), a production failure density (e.g. likelihood that productions fail over time), a log exception density (e.g. amount of log exception for size of total logs), a performance (e.g. average of collected performance metrics), a velocity (e.g. average time to resolution), a security vulnerability count (e.g. number of security vulnerabilities discovered), a deprecation status (e.g. has the version deprecated?), a functionality size (e.g. size of total functionality by available methods), and a number of defects (e.g. number of outstanding defects against a version). The metrics are temporally-based features that are used to identify quality and performance of the software project 110 after having undergone changes to the versions of the dependencies over time.

Figure 2:
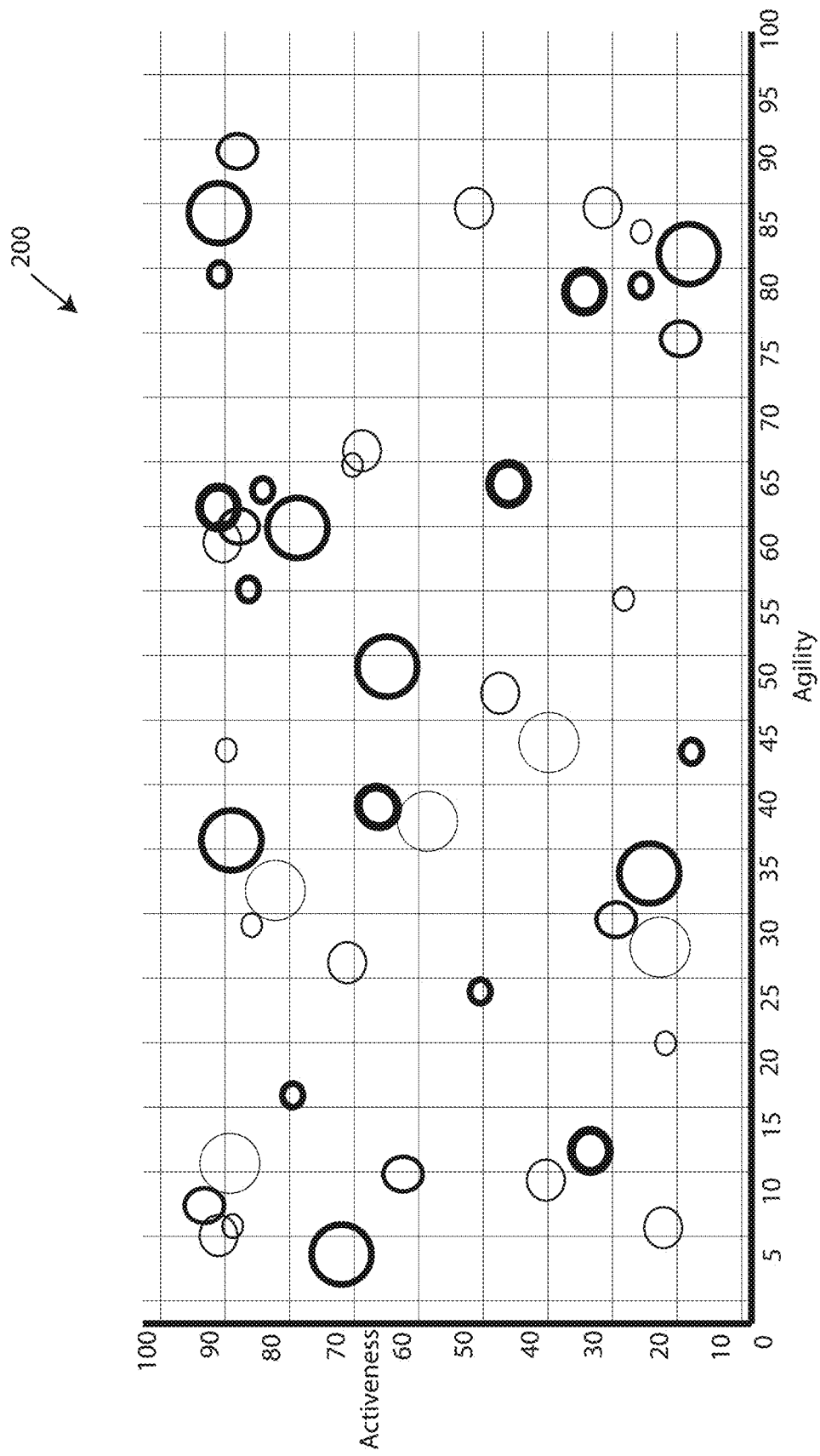
FIG. 2 depicts a scatterplot of a plurality of software project clusters, in accordance with embodiments of the present invention.

Referring still to FIG. 1 embodiments of the computing system 120 may include a clustering module 132. Embodiments of the clustering module 132 may include one or more components of hardware and/or software program code for clustering the software projects 110 based on the metrics and the dependency version lineages, resulting in a plurality of software project clusters. For instance, similar software projects 110 are clustered together based on similar metric values, similar dependencies, and similar dependency versions. FIG. 2 depicts a scatterplot 200 of a plurality of software project clusters, in accordance with embodiments of the present invention. The scatterplot 200 includes a horizontal axis measuring agility from 0-100 and a vertical axis measuring activeness. Agility refers to how fast or how efficient an issue can be resolved, and activeness refers to how frequent updates are being made to the dependencies. The clusters shown on the scatterplot 200 indicate clusters or groupings of similar software projects, such as software projects 110.

The clustering module 132 determines the most similar N software projects based on multiple dimensions. The clustering module 132 performs a k-means clustering analysis to partition all N software projects into several clusters in which each software project belongs to the cluster with the nearest mean. In an exemplary embodiment, IBM CLOUD'S PUBLIC DEVOPS INSIGHTS FOR OPEN SOURCE uses multiple dimension to cluster similar projects together. The scatterplot 200 shows an example of N number of software projects clustered together based on the metrics and/or the dependency lineages determined by the mining module 131. The clustering is not limited to the metrics expressly stated above, and can also include other metrics like majority language of repository and percent dependency overlap, as an example.

Embodiments of the computing system 120 may include a target software project module 133. Embodiments of the target software project module 133 may include one or more components of hardware and/or software program for extracting target metrics and a target version lineage of a target software project, the target software project 111 having a plurality of software dependencies. The target software project 111 is the software project that a user would like a recommendation on whether o pursue a dependency upgrade. In response to the target software project being introduced into the system, the target software project module 133 analyzes the target software project to calculate metrics of the target software project 111 (i.e. target metrics) and a dependency version lineage of the target software project. The target metrics and the target dependency version lineage are extracted similar to the procedure described above. For example, public or private data associated with the target software project 111 is retrieved by the target software project module 133 and then stored in the repository 113 or an independent code repository. The target software project module 133 mines the repository storing the software data artifacts received from centralized systems of the target software project 111, and determines the target dependency lineage and the target metrics for each dependency and each version of the dependency being used by the target software project 111, which are then compared with the metrics and the dependency version lineages of similar software projects 110, as described below.

Figure 3:
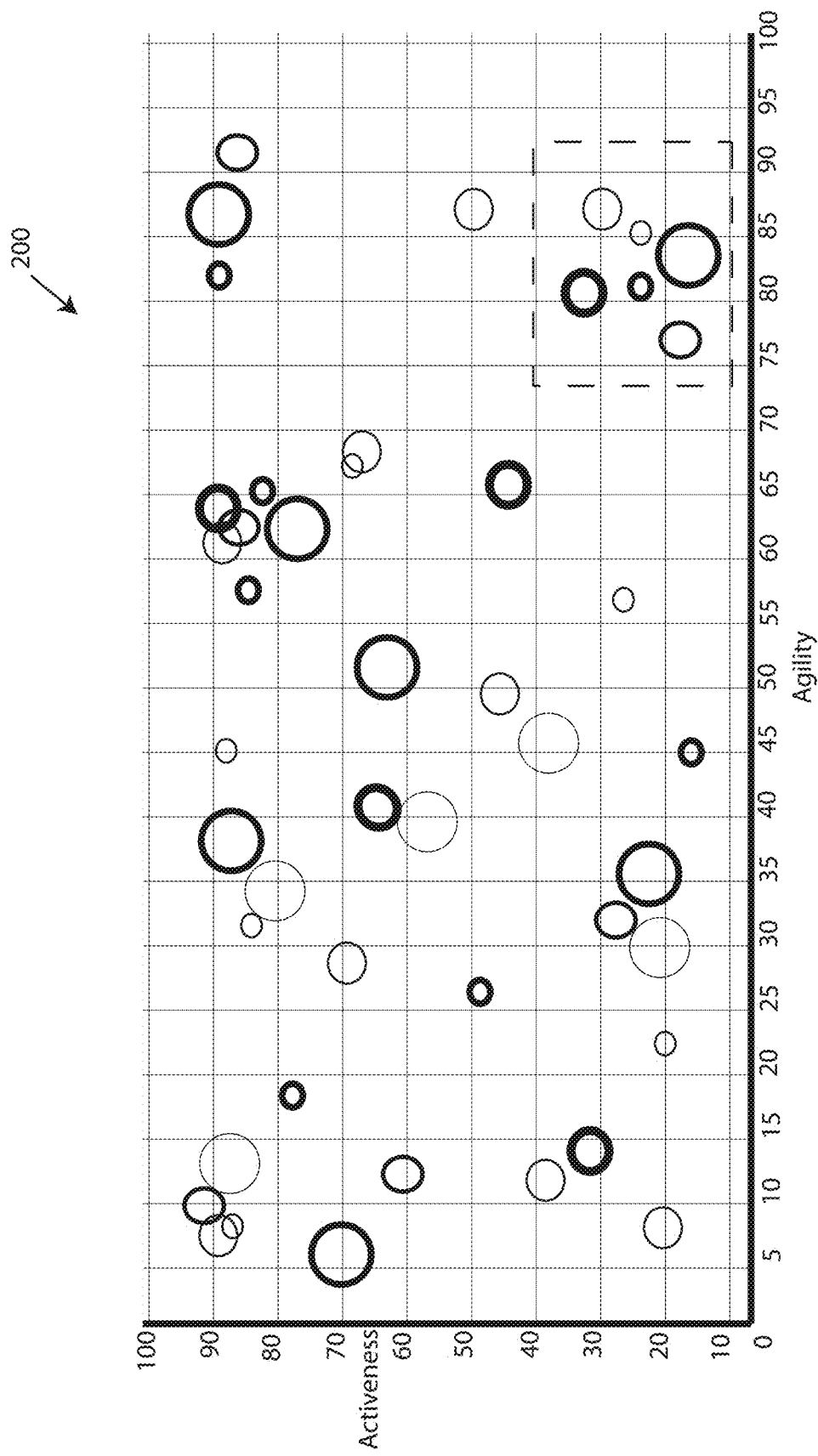
FIG. 3 depicts the scatterplot 200 of FIG. 2, wherein a cluster of software projects has been selected for analysis, in accordance with embodiments of the present invention.

Embodiments of the computing system 120 may include an analytics module 134. Embodiments of the analytics module 134 may include one or more components of hardware and/or software program for selecting at least one software project cluster from the plurality of software project clusters that best matches the target software project. For instance, the analytics module 134 selects a cluster of software projects having metrics and dependency version lineages that are the most similar to the target metrics and the target dependency of the target software application 111. As an example, the selected cluster includes software projects that have four dependencies out of five dependencies that are the same as the target software project 111. FIG. 3 depicts the scatterplot 200 of FIG. 2, wherein a cluster of software projects has been selected for analysis, in accordance with embodiments of the present invention. The analytics module 134 analyzes the metrics for each of the software projects included in the selected software project cluster to determine that a measurable change to the metrics occurred as a result of upgrading dependencies of the software projects. For example, the analytics module 134 compares the different metrics of the similar software projects from the version changes with the target metrics of the target software project to determine whether a value of the metric has changed positively or negatively. A positive measurable change to the metrics indicates that the dependencies associated with the software projects in the at least one software project cluster successfully transitioned to a new dependency software. A negative measurable change to the metrics indicates that the dependencies associated with the software projects in the at least one software project cluster did not successfully transition to the new dependency software version. In the event of a negative measurable change, a risk assessment is performed to determine an amount of risk associated with upgrading a dependency of the target software project that is the same as one of the dependencies associated with the software projects.

FIG. 4 depicts multiple dependency-specific tables showing measurable changes to the metrics of a software project in a selected cluster, in accordance with embodiments of the present invention. The metric values of each dependency of a single software project are shown in table format and were collected before and after a dependency-altering update was performed. In this example, the software project includes a dependency lineage as follows: Dependency A, Version 1, Dependency A, Version 1.1, Dependency A, Version 1.2, Dependency B, Version 1, Dependency B, Version 2, and Dependency B, Version 3. The values for the metrics have been extracted by the computing system 120 as described above. The metric values are shown as integers in the table from 0-10; however, any range of numbers can be used for assigning the metric values to each metric of the dependency. Optionally, a weighting scheme can be applied to the metric values to account for metrics that may affect the risk more than other metrics or for metrics that may affect a positive recommendation to pursue the upgrade more than other metrics. The value of the defect density for Dependency A, Version 1.1 is 1.1, prior to the dependency-altering update to Version 1.2. When Dependency A, Version 1.1 was upgraded to Dependency A, Version 1.2, the value of the defect density increased to 3.4, which means that the upgrade to Dependency A, Version 1.2 caused a negative measurable change to the defect density metric. As a result, there is some risk associated with upgrading to Version 1.2 from Version 1.1 with respect to defect density, but not from Version 1.2 to Version 1.3 because the defect density value of Version 1.3 stayed the same. The value of the size of added code for Dependency A. Version 1.1 is 6.4, prior to the dependency-altering update to Version 1.2. When Dependency A, Version 1.1 was upgraded to Dependency A, Version 1.2, the value of the size of added code decreased to 3.7, which means that the upgrade to Dependency A, Version 1.2 caused a positive measurable change to the size of added code metric. As a result, upgrading to Version 1.2 from Version 1.1 with respect to size of added code was a successful transition, also from Version 1.2 to Version 1.3 because the size of added code value of Version 1.3 was also reduced. Accordingly, the recommendation regarding Dependency A might be to not perform the upgrade because of the risk associated with key metrics, even though the performance metric was slightly increased as a result of the upgrade.

Further, the value of the performance metric for Dependency B, Version 1 is 4.8, prior to the dependency-altering update to Version 2. When Dependency B, Version 1 was upgraded to Dependency B, Version 2, the value of the performance increased to 7.4, which means that the upgrade to Dependency B, Version 2 caused a positive measurable change to the performance metric. However, the dependency-altering update to Version 3 from Version 2 reduced the performance metric to 3.9. The value of the defect density metric for Dependency B, Version 1 is 2.8, prior to the dependency-altering update to Version 2. When Dependency B, Version 1 was upgraded to Dependency B, Version 2, the value of the defect density metric slightly increased to 2.9, which means that the upgrade to Dependency B, Version 1.2 caused a negative measurable change to the defect density metric. However, the positive measurable change to the performance metric by upgrading to Version 2 outweighs the risks associated with the defect density. Accordingly, the recommendation would be to upgrade Dependency B to Version 2, but not to Version 2 because the risk is still present with respect to the defect density without the improvement to the performance metric because the value of the performance metric is measured to have decreased significantly as a result of the dependency-altering upgrade to Version 3.

Various measurable changes to the metrics can be analyzed to determine whether the metric was positively or negatively impacted by a dependency version change. Because the dependency version lineages of the software project in the selected cluster match a portion of the dependency version lineage, a prediction can be made as to what is likely to occur if the target software project is upgraded to a particular dependency version.

To determine a measurable change to a metric, the analytics module 134 performs a statistical analysis of the metrics for each software project contained in the selected cluster. In an exemplary embodiment, the statistical analysis includes calculating a multivariate distribution, such as a Hotelling T-square distribution. By way of an example, N similar software projects are included in a selected cluster, with the metrics and version lineages being known. The analytics module 134 determines whether a particular dependency version change leads to improvement. Let $M\_1i$ be the ith measurement for dependency version 1 and $M\_2i$ be the ith measurement for dependency version 2. To test the null hypothesis that the true mean difference of the ith measurement between these two versions is zero, the following procedure is implemented: a) calculate a difference $delta\_i = M\_2i - M\_1i$ between the two observations on each project for i; b) calculate a sample mean vector: $X=[delta\_1, delta\_2, \ldots, delta\_p]$, where p is the number of metrics; c) calculate a sample variance-covariance matrix and its inverse, named S; d) calculate the Hotelling's T2 by $T2=N*X*S*X$; e) transform the above Hotelling T2 statistic by $F=[(N-p)/p(N-1)]T2$; and f) under null hypothesis that there is no statistical difference between these two versions, the above statistics will have a F distribution with p and N-p degrees of freedom. The null hypothesis is rejected at level α (e.g. 95%), if the test statistic F is greater a the critical value from the F-table with p and N-p degrees of freedom evaluated at level α. The hypothesis testing part of the statistical analysis determines which version of the dependencies is better supported by the evidence of each metric.

Referring again to FIG. 1, embodiments of the computing system 120 may include a recommendation module 135. Embodiments of the augmenting module 135 may include one or more components of hardware and/or software program for recommending which software dependencies of the target software project should be upgraded based on the measurable change to the metrics of the software projects. The recommendation can include: do not perform upgrade, only upgrade some of the dependencies of the target software project, upgrade a dependency only to a specific version, perform a full upgrade to most recent dependency version, and the like. The recommendation is based on the positive and negative changes to the metrics caused by previous dependency-altering upgrades in similar software projects.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the dependency upgrade recommendation system 100 improves an efficiency of software dependency changes using recommendation application 130. The dependency upgrade recommendation system 100 improves the decision making for upgrading specific and unique software dependencies associated with a target software project. The improvement is both in speed and in accuracy. With the dependency upgrade recommendation system 100, a decision to upgrade a particular software dependency to a particular version is made much faster than with conventional methods. The accuracy of the decision avoids costly and resource-draining mistakes when a software dependency upgrade is made that reduces the performance of the software project.

Furthermore, the dependency upgrade recommendation system 100 reduces processing power and computer resources required to test and re-test potential upgrades within an environment. For example, without the dependency upgrade recommendation system 100, a software development team needs to run multiple tests to determine whether the dependency-altering update would cause a problem with the software project before deploying the upgrade, which further delays the upgrade. The technical solution(s) described herein is necessarily rooted in computer technology in order to overcome a problem specifically arising in the realm of software dependency upgrade integrations.

Figure 5:
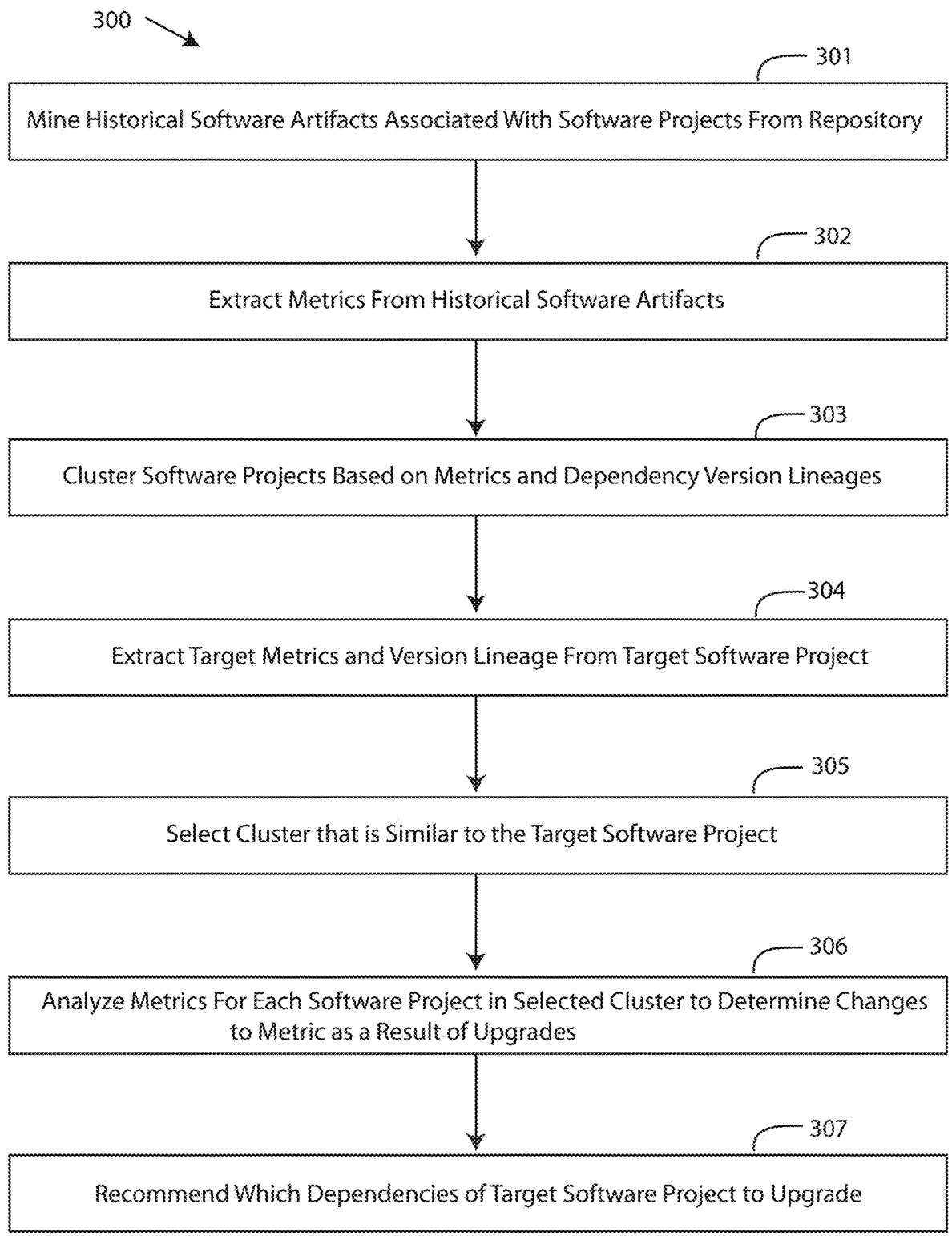
FIG. 5 depicts a flow chart of a method for recommending whether to upgrade dependencies of a software project, in accordance with embodiments of the present invention.

Referring now to FIG. 5, which depicts a flow chart of a method 300 for recommending whether to upgrade dependencies of a software project, in accordance with embodiments of the present invention. One embodiment of a method 300 or algorithm that may be implemented for recommending whether to upgrade dependencies of a software project with the dependency upgrade recommendation system 100 described in FIGS. 1-4 using one or more computer systems as defined generically in FIG. 7 below, and more specifically by the specific embodiments of FIG. 1.

Embodiments of the method 300 for recommending whether to upgrade dependencies of a software project, in accordance with embodiments of the present invention, may begin at step 301 wherein historical software data artifacts associated with software projects are mined. Step 302 extracts metrics from the historical software artifacts stored on a repository. Step 303 clusters software projects based on metrics and dependency version lineages. Step 304 extracts target metrics and a dependency version lineage from a target software project. Step 305 selects a cluster that is the most similar to the target software project. Step 306 analyzes metrics for each software project in the selected cluster to determine changes to the metrics as a result of the upgrades. Step 307 recommends which dependencies of the target software project should be upgraded.

Figure 6:
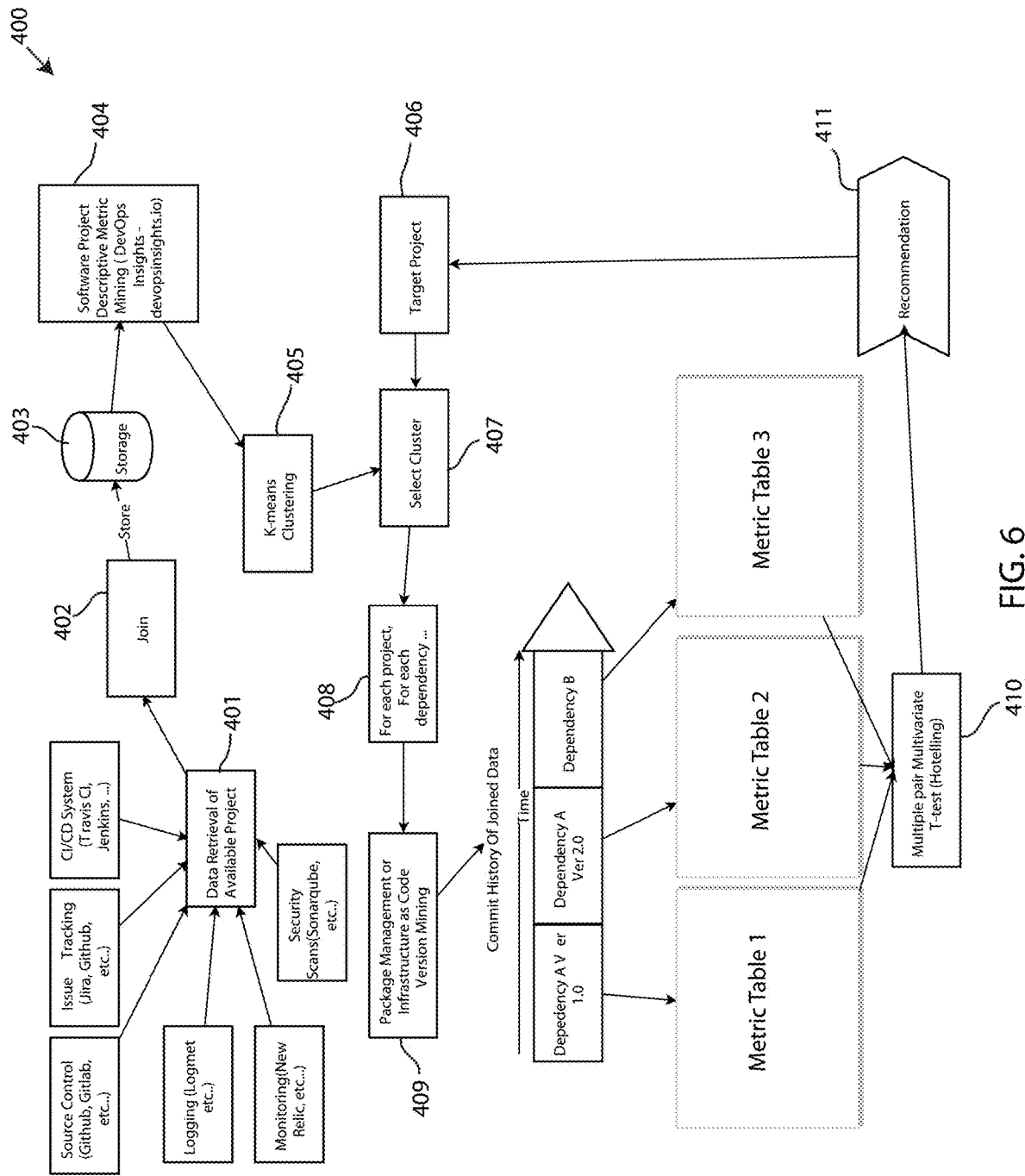
FIG. 6 depicts a detailed flow chart of a method for recommending whether to upgrade dependencies of a software project, in accordance with embodiments of the present invention.

FIG. 6 depicts a detailed flow chart of a method 400 for recommending whether to upgrade dependencies of a software project, in accordance with embodiments of the present invention. Step 401 retrieves data from available software projects. Step 402 joins the data retrieved from the software projects. The joined data is stored at step 403 in a repository. Step 404 mines the repository storing the joined data artifacts. Step 405 performs a k-means clustering operation resulting in a plurality of clusters of similar software projects. Step 406 receives the target software project and determines target metrics and the dependency version lineage of the target software project. Step 407 selects the cluster from a plurality of clusters that best matches the target software project. At step 408, each dependency and each software project are analyzed for further mining at step 409. Various measurable changes to the metrics can be analyzed to determine whether the metric was positively or negatively impacted by a dependency version change. The values of the metrics for each software project and for each dependency is contained in the metric tables 1-3 depicted schematically in the drawings. To determine the measurable changes to the metrics as a result of a dependency upgrade, step 410 performs a multiple pair multivariate Hotelling T-test. Step 411 provides a recommendation whether a dependency upgrade is worth pursuing with respect to the target software project, as well as which dependencies should or should not be upgraded, and to which versions of the dependencies.

Figure 7:
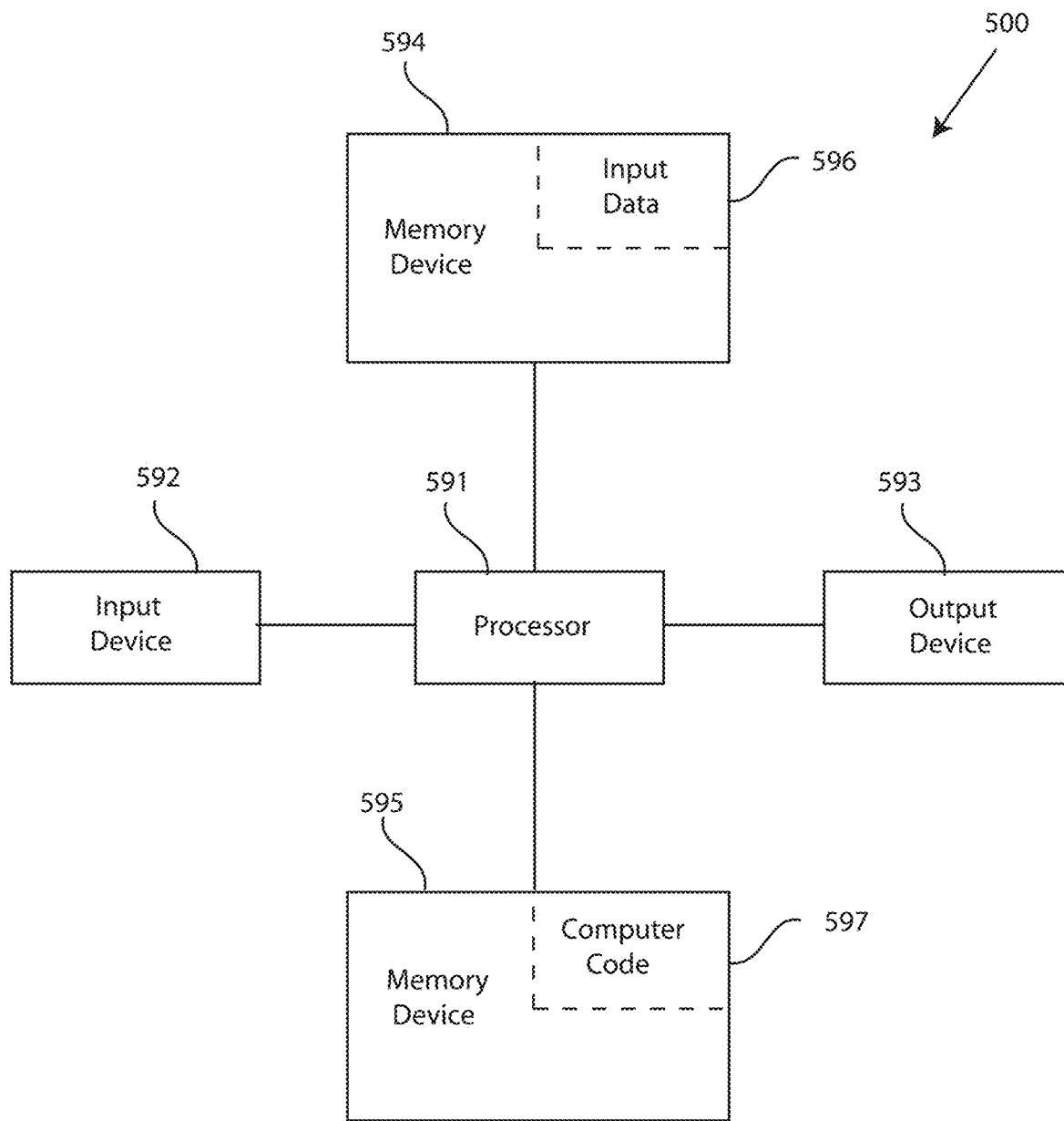
FIG. 7 depicts a block diagram of a computer system for the dependency upgrade recommendation system of FIGS. 1-4, capable of implementing methods for recommending whether to upgrade dependencies of a software project of FIGS. 5-6, in accordance with embodiments of the present invention.

FIG. 7 depicts a block diagram of a computer system for the dependency upgrade recommendation system 100 of FIGS. 1-4, capable of implementing methods for recommending whether to upgrade dependencies of a software project of FIGS. 5-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for recommending whether to upgrade dependencies of a software project in the manner prescribed by the embodiments of FIGS. 5-6 using the dependency upgrade recommendation system 100 of FIGS. 1-4, wherein the instructions of the computer code 597 may be executed by processor 591 via memory device 595. The computer code 597 may include software or program instructions that may implement one or more algorithms for implementing the method for recommending whether to upgrade dependencies of a software project, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (RUM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to dependency upgrade recommendation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to recommend whether to upgrade dependencies of a software project. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for recommending whether to upgrade dependencies of a software project. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for recommending whether to upgrade dependencies of a software project.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models areas follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
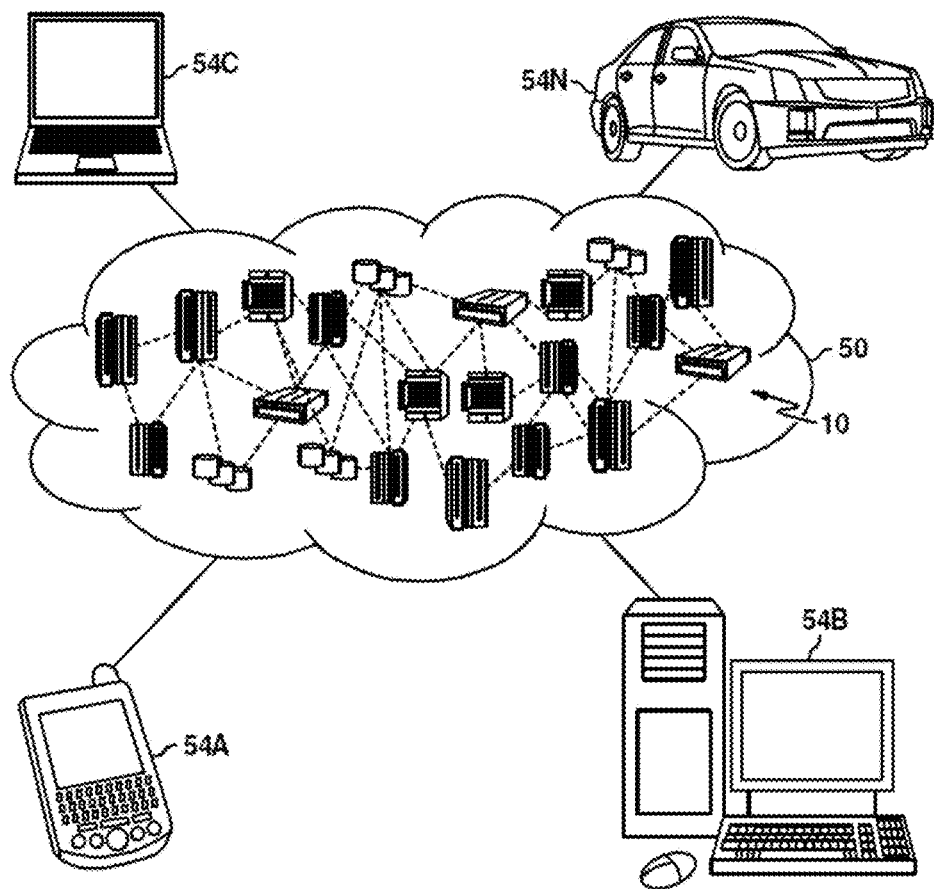
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
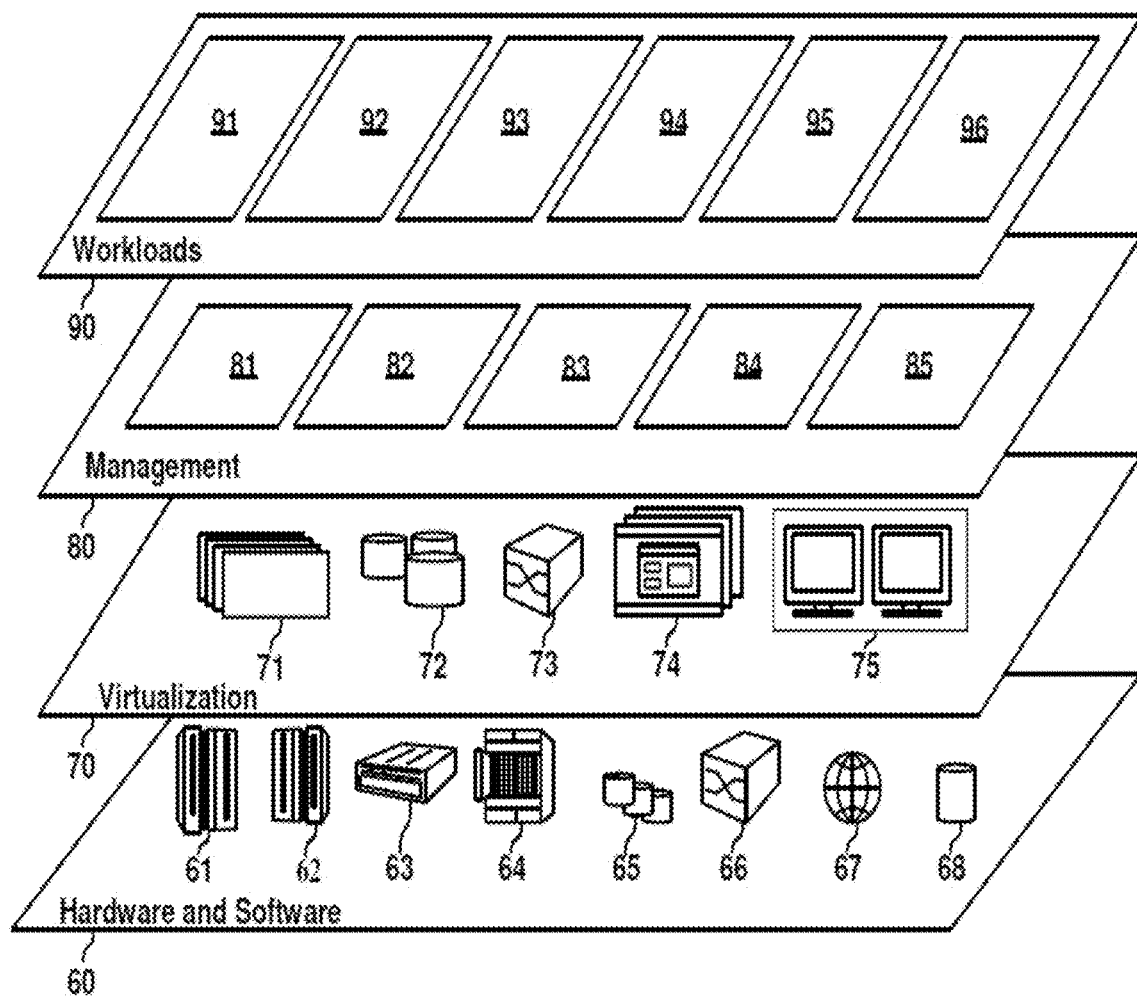
FIG. 9 depicts abstraction model layers, in accordance with embodiments of the present invention.

Referring now to FIG. 9, a set of functional abstraction layers provided by cloud computing environment 50 (see FIG. 8) are shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and software dependency upgrade recommendations 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for recommending whether to upgrade dependencies of a software project, the method comprising:
    mining, by a processor of a computing system, historical software data artifacts associated with a plurality of software projects to extract a plurality of metrics and dependency version lineages from the historical software data artifacts;
    clustering, by the processor, the software projects based on the metrics and the dependency version lineages, resulting in a plurality of software project clusters;
    extracting, by the processor, target metrics and a target version lineage of a target software project, the target software project having a plurality of software dependencies;
    selecting, by the processor, at least one software project cluster from the plurality of software project clusters that best matches the target software project;
    analyzing, by the processor, the metrics for each of the software projects included in the at least one software project cluster to determine that a measurable change to the metrics occurred as a result of upgrading dependencies of the software projects;
    recommending, by the processor, which software dependencies of the target software project should be upgraded based on the measurable change to the metrics of the software projects; and
    deploying, by the processor, an upgrade of the software dependencies of the target software project, as a function of the recommending.

2. The method of claim I, wherein a positive measurable change to the metrics indicates that the dependencies associated with the software projects in the at least one software project cluster successfully transitioned to a new dependency software version, further wherein a dependency associated with the target software project is the same as one of the dependencies associated with the software projects.

3. The method of claim 1, wherein a negative measurable change to the metrics indicates that, the dependencies associated with the software projects in the at least one software project duster includes did not successfully transition to a new dependency software version.

4. The method of claim 3, wherein a risk assessment is performed to determine an amount of risk associated with upgrading a dependency of the target software project that is the same as one of the dependencies associated with the software projects.

5. The method of claim 1, wherein analyzing the metrics for each of the software projects includes performing a statistical analysis of metrics to determine the measurable change to the metrics, the statistical analysis including calculating a multivariate distribution.

6. The method of claim 1, wherein the metrics include a defect density, a build time, a test failure density, a size of deprecated code, a size of added code, a deployment time, a production failure density, a log exception density, a performance, a velocity, a security vulnerability count, a deprecation status, a functionality size, and a number of defects.

7. The method of claim 1, further comprising:
    joining, by the processor, the historical software data artifacts received from one or more centralized system of the plurality of software projects; and
    storing, by the processor, the historical software data artifacts associated with a plurality of software projects in a repository, from which the historical software data artifacts are mined.

8. The method of claim 7, wherein the centralized systems include a source control management system, an issue tracking system, an automated build and test system, and a monitoring system.

9. A computing system, comprising:
    a processor;
    a memory device coupled to the processor; and
    a computer readable storage device coupled to the processor, wherein the storage device contains program code executable by the processor via the memory device to implement a method for recommending whether to upgrade dependencies of a software project, the method comprising:
        mining, by the processor, historical software data artifacts associated with a plurality of software projects to extract a plurality of metrics and dependency version lineages from the historical software data artifacts;
        clustering, by the processor, the software projects based on the metrics and the dependency version lineages, resulting in a plurality of software project clusters;

extracting, by the processor, target metrics and a target version lineage of a target software project, the target software project having a plurality of software dependencies;

selecting, by the processor, at least one software project cluster from the plurality of software project clusters that best matches the target software project;

analyzing, by the processor, the metrics for each of the software projects included in the at least one software project cluster to determine that a measurable change to the metrics occurred as a result of upgrading dependencies of the software projects;

recommending, by the processor, which software dependencies of the target software project should be upgraded based on the measurable change to the metrics of the software projects; and deploying, by the processor, an upgrade of the software dependencies of the target software project, as a function of the recommending.

10. The computing system of claim 9, wherein a positive measurable change to the metrics indicates that the dependencies associated with the software projects in the at least one software project cluster successfully transitioned to a new dependency software version, further wherein a dependency associated with the target software project is the same as one of the dependencies associated with the software projects.

11. The computing system of claim 9, wherein a negative measurable change to the metrics indicates that the dependencies associated with the software projects in the at least one software project cluster includes did not successfully transition to a new dependency software version.

12. The computing system of claim 11, wherein a risk assessment is performed to determine an amount of risk associated with upgrading a dependency of the target software project that is the same as one of the dependencies associated with the software projects.

13. The computing system of claim 9, wherein analyzing the metrics for each of the software projects includes performing a statistical analysis of metrics to determine the measurable change to the metrics, the statistical analysis including calculating a multivariate distribution.

14. The computing system of claim 9, wherein the metrics include a defect density, a build time, a test failure density, a size of deprecated code, a size of added code, a deployment time, a production failure density, a log exception density, a performance, a velocity, a security vulnerability count, a deprecation status, a functionality size, and a number of defects.

15. The computing system of claim 9, further comprising:
joining, by the processor, the historical software data artifacts received from one or more centralized system of the plurality of software projects; and
storing, by the processor, the historical software data artifacts associated with a plurality of software projects in a repository, from which the historical software data artifacts are mined.

16. The computing system of claim 15, wherein the centralized systems include a source control management system, an issue tracking system, an automated build and test system, and a monitoring system.

17. A computer program product, comprising a computer readable hardware storage device storing a computer readable program code, the computer readable program code comprising an algorithm that when executed by a computer processor of a computing system implements a method for recommending whether to upgrade dependencies of a software project, the method comprising:

mining, by the processor, historical software data artifacts associated with a plurality of software projects to extract a plurality of metrics and dependency version lineages from the historical software data artifacts;

clustering, by the processor, the software projects based on the metrics and the dependency version lineages, resulting in a plurality of software project clusters;

extracting, by the processor, target metrics and a target version lineage of a target software project, the target software project having a plurality of software dependencies;

selecting, by the processor, at least one software project cluster from the plurality of software project clusters that best matches the target software project;

analyzing, by the processor, the metrics for each of the software projects included in the at least one software project cluster to determine that a measurable change to the metrics occurred as a result of upgrading dependencies of the software projects;

recommending, by the processor, which software dependencies of the target software project should be upgraded based on the measurable change to the metrics of the software projects; and deploying, by the processor, an upgrade of the software dependencies of the target software project, as a function of the recommending.

18. The computer program product of claim 17, wherein a positive measurable change to the metrics indicates that the dependencies associated with the software projects in the at least one software project cluster successfully transitioned to a new dependency software version, further wherein a dependency associated with the target software project is the same as one of the dependencies associated with the software projects.

19. The computer program product of claim 17, wherein a negative measurable change to the metrics indicates that the dependencies associated with the software projects in the at least one software project cluster includes did not successfully transition to the a new dependency software version, wherein a risk assessment is performed to determine an amount of risk associated with upgrading a dependency of the target software project that is the same as one of the dependencies associated with the software projects.

20. The computer program product of claim 17, wherein the metrics include a defect density, a build time, a test failure density, a size of deprecated code, a size of added code, a deployment time, a production failure density, a log exception density, a performance, a velocity, a security vulnerability count, a deprecation status, a functionality size, and a number of defects.

* * * * *